US010175361B2

(12) United States Patent
Haines et al.

(10) Patent No.: US 10,175,361 B2
(45) Date of Patent: Jan. 8, 2019

(54) SYSTEM AND METHOD FOR THREE-DIMENSIONAL MAPPING USING TWO-DIMENSIONAL LIDAR LASER RANGING

(71) Applicant: Sharp Laboratories of America, Inc., Camas, WA (US)

(72) Inventors: Darin Haines, Washougal, WA (US); William Vojak, Battle Ground, WA (US); Gary Gaebel, Vancouver, WA (US); John Thomas, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 203 days.

(21) Appl. No.: 15/221,685

(22) Filed: Jul. 28, 2016

(65) Prior Publication Data

US 2018/0031705 A1 Feb. 1, 2018

(51) Int. Cl.
  *G01C 3/08*  (2006.01)
  *G01S 17/89*  (2006.01)
  *G01S 7/481*  (2006.01)
  *G01S 17/42*  (2006.01)

(52) U.S. Cl.
  CPC .......... *G01S 17/89* (2013.01); *G01S 7/4817* (2013.01); *G01S 17/42* (2013.01)

(58) Field of Classification Search
  CPC ......... G01S 17/89; G01S 17/42; G01S 7/4817
  USPC ...................................................... 356/5.01
  See application file for complete search history.

(56) References Cited

U.S. PATENT DOCUMENTS

| 5,552,893 | A | * | 9/1996 | Akasu ................. G01C 3/00 356/4.01 |
| 5,689,335 | A | | 11/1997 | Strauss |
| 6,559,932 | B1 | | 5/2003 | Halmos |
| 6,650,402 | B2 | | 11/2003 | Sullivan et al. |
| 7,248,342 | B1 | | 7/2007 | Degnan |
| 7,697,126 | B2 | | 4/2010 | Farsaie |
| 8,050,863 | B2 | * | 11/2011 | Trepagnier .......... B60W 30/00 180/167 |

(Continued)

FOREIGN PATENT DOCUMENTS

| AU | 2011281377 | 1/2013 |
| CN | 102508257 | 6/2012 |

(Continued)

*Primary Examiner* — Mark Hellner
(74) *Attorney, Agent, or Firm* — ScienBiziP, P.C.; Alvin Koan

(57) ABSTRACT

A system and method are presented for using a two-dimensional (2D) LiDAR for three dimensional (3D) laser mapping. The 2D-LiDAR is mounted in a chassis. The method laser ranges a planar slice of the environment. Simultaneous with laser ranging the planar slice, the 2D LiDAR chassis is rotated about an axis to create a 3D laser mapping of at least a portion of the environment. More explicitly, the 2D LiDAR may include a laser ranger with a planar actuator, typically the combination of a laser and a rotating mirror. In addition, the 2D LiDAR chassis is mounted on a reciprocating actuator. Thus, the step of laser ranging the planar slice includes laser ranging the planar slice in response to the planar actuator. The step of rotating the 2D LiDAR chassis includes rotating the 2D LiDAR chassis around an axis parallel to the planar slice, in response to the reciprocating actuator.

12 Claims, 6 Drawing Sheets

(56) References Cited

U.S. PATENT DOCUMENTS

| | | |
|---|---|---|
| 8,379,190 B2 | 2/2013 | Edwards et al. |
| 8,446,571 B2 | 5/2013 | Fiess et al. |
| 8,767,190 B2 | 7/2014 | Hall |
| 8,909,375 B2 * | 12/2014 | Larson ................ G01S 7/4817 |
| | | 700/245 |

FOREIGN PATENT DOCUMENTS

| | | |
|---|---|---|
| CN | 102944933 | 2/2013 |
| JP | 2003004851 | 2/2013 |
| KR | 101427364 | 8/2014 |

* cited by examiner

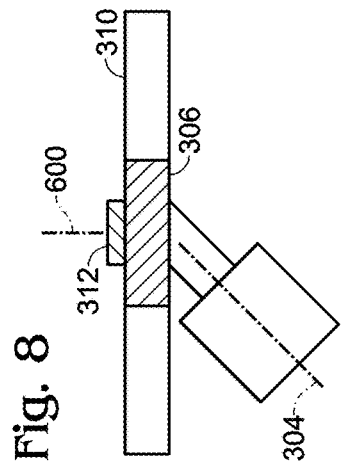
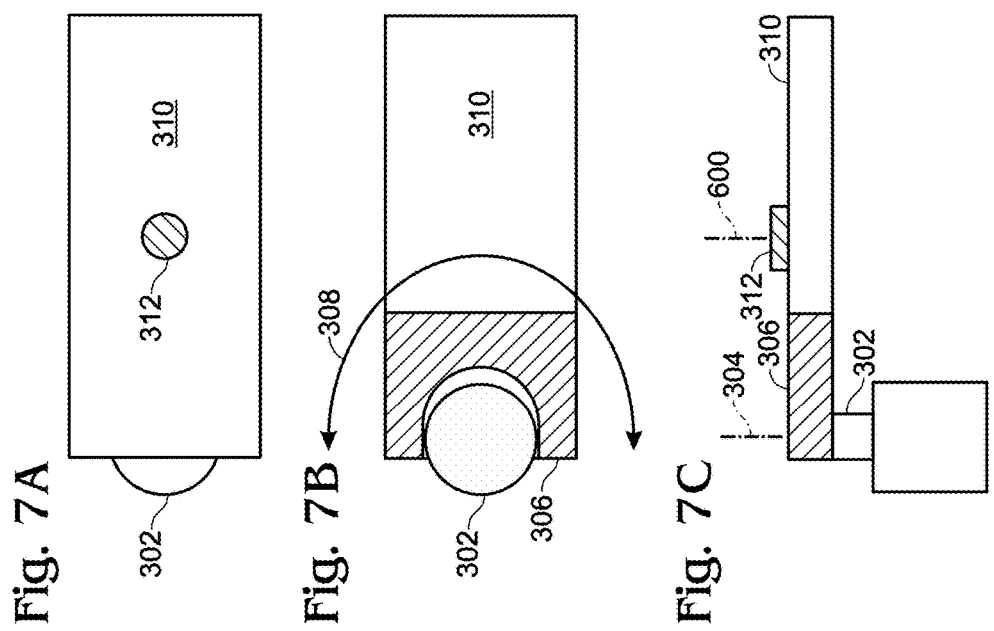

SYSTEM AND METHOD FOR THREE-DIMENSIONAL MAPPING USING TWO-DIMENSIONAL LIDAR LASER RANGING

BACKGROUND OF THE INVENTION

1. Field of the Invention

This invention generally relates to environment mapping and, more particularly, to a system and method for modifying a two-dimensional (2D) light detection and ranging (LiDAR) system for use in three-dimensional (3D) mapping.

2. Description of the Related Art

A LiDAR is often the primary source of sensor data used by robots for Simultaneous Localization And Mapping (SLAM) reconstruction, obstacle detection and avoidance, feature detection, and scene classification, as well as other applications in the field of mobile robotics. LiDAR uses ultraviolet, visible, or near infrared light to image objects. A fixed 2D LiDAR can be constructed by bouncing a laser beam off a spinning mirror. As with RADAR, the difference in time between transmitted and returned signals determines the distance to, and shape of objects in the environment. This is a functionally limited, but inexpensive and robust device. Fixed 2D LiDAR units are often configured to face forward. Forward-facing, 2D LiDARs sample a planar slice of the environment, and thus are not fully aware of their surroundings.

FIGS. 1A and 1B are, respectively, a plan (top) view of a 2D LiDAR at rest, and a horizontal beam sweep (prior art). In FIG. 1A the laser beam faces forward, along the X-axis. In FIG. 1B, an actuator sweeps the laser beam through a horizontally oriented 270° arc about the (vertical) Z-axis. Notice the "blind spot" behind the LiDAR. In theory, the horizontal sweep can cover a full 360 degrees, but in practice the sweep is usually limited by chassis supporting the laser and mirror. However, the main limitation is that the sweep only covers a narrow horizontal sliver of the environment.

FIG. 2 is a diagram of a conventional 2D LiDAR device (prior art). The laser reflected off the rotating mirror creates the horizontal sweep.

To improve upon this performance, 3D LiDAR products mechanically tilt (or "nod") the basic 2D LiDAR or spin it freely about an axis that is in the plane of the 2D scan. The nodding design creates a longitudinal scan pattern with maximum sample density at the poles of the nodding axis. The fully rotating design can scan a more complete field of view, but it requires a complex mechanical linkage.

Because the laser is a power consuming device these configurations require some means to get power and data onto and off of the spinning LiDAR device. One solution to this problem is to use slip-ring electrical contacts that are subject to mechanical wear. Another solution is to co-locate batteries on the spinning LiDAR unit. But without a supplemental charging source the batteries run down, thus limiting service uptime. Both of these solutions come with increased maintenance requirements and introduce potential failure points.

It would be advantageous if conventional 2D LiDAR technology could be augmented to create 3D mapping scans and thus replace the vastly more expensive 3D LiDAR products that are on the market today.

SUMMARY OF THE INVENTION

Disclosed herein are means to use two-dimensional (2D) light detection and ranging (LiDAR) data to create a three-dimensional (3D) terrain image. The disclosed 2D LiDAR rotational scheme eliminates deficiencies in existing systems to permit the generation of enough 2D data to provide a 3D image of the terrain surrounding an autonomous platform.

At its core, a LiDAR rangefinder is a laser with a detector to collect reflected light. With proper means, the laser beam can be swept through a range of motion that covers its surroundings. With conventional mechanical coupling this motion creates a planar scan of the surroundings that may be restricted to a 2D arc or may be a 2D full circle, depending upon the construction of the LiDAR.

The system and method disclosed herein adds another dimension to the 2D scan by rocking (or "oscillating") the 2D LiDAR assembly back and forth about some axis that is typically parallel to the scanned plane. By "rocking" the 2D LiDAR assembly about this axis, 3D LiDAR functionality can be delivered without the complexity of slip-ring electrical contacts that are used in many more expensive products. This creates a nearly complete 3D field of view.

Accordingly, a method is presented for using 2D LiDAR for 3D laser mapping. The method provides a 2D LiDAR mounted in a chassis. The method laser ranges a planar slice of the environment, as is conventional. In one aspect, two (or more) parallel planar slices of the environment are ranged. Simultaneous with laser ranging the planar slice, the 2D LiDAR chassis is rotated about an axis to create a 3D laser mapping of at least a portion of the environment. More explicitly, the 2D LiDAR may include a laser ranger with a planar actuator, typically the combination of a laser, detector, and a rotating mirror. In addition, the 2D LiDAR chassis is mounted on a reciprocating actuator. Thus, the step of laser ranging the planar slice includes laser ranging the planar slice in response to the planar actuator. The step of rotating the 2D LiDAR chassis includes rotating the 2D LiDAR chassis around an axis parallel to the planar slice, in response to the reciprocating actuator.

Alternatively stated, the step of rotating the 2D LiDAR chassis around the axis includes alternating the direction of rotation prior to the completion of a complete revolution of the 2D LiDAR chassis around the axis. More explicitly, alternating the direction of rotation prior to the completion of a complete revolution of the 2D LiDAR chassis around the axis includes the substeps of rotating the 2D LiDAR chassis in a first direction less than or equal to 180 degrees, and then rotating the 2D LiDAR chassis in a second direction, opposite to the first direction, less than or equal to 180 degrees. The axis about which the 2D LiDAR chassis rotates may be aligned with the laser ranging axis (the laser beam), parallel to, but not aligned with the laser ranging axis, or non-parallel to the laser ranging axis.

Additional details of the above-described method and a three-dimensional LiDAR system using a two-dimensional LiDAR are presented below.

BRIEF DESCRIPTION OF THE DRAWINGS

FIGS. 7A through 7C depict, respectively, front, back, and side views of a side-mounted reciprocating actuator.

FIG. 8 is a side view of an off ranging axis-mounted reciprocating actuator.

FIG. 11 is a flowchart illustrating a variation in the method for using 2D LiDAR for 3D laser mapping.

DETAILED DESCRIPTION

Figure 1A:
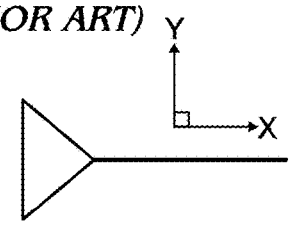
FIGS. 1A and 1B are, respectively, a plan (top) view of a 2D LiDAR at rest, and a horizontal beam sweep (prior art).
Figure 1B:
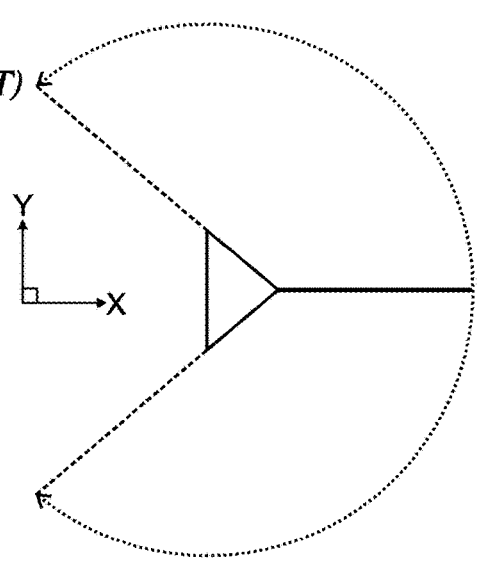
Figure 2:
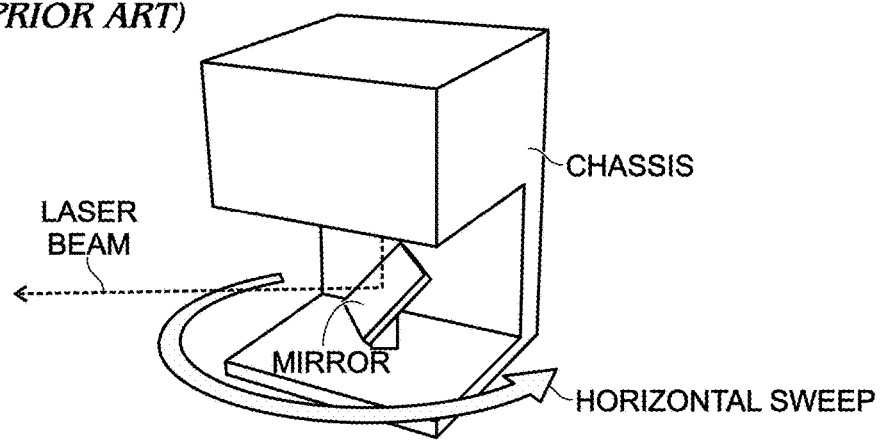
FIG. 2 is a diagram of a conventional 2D LiDAR device (prior art).
Figure 3:
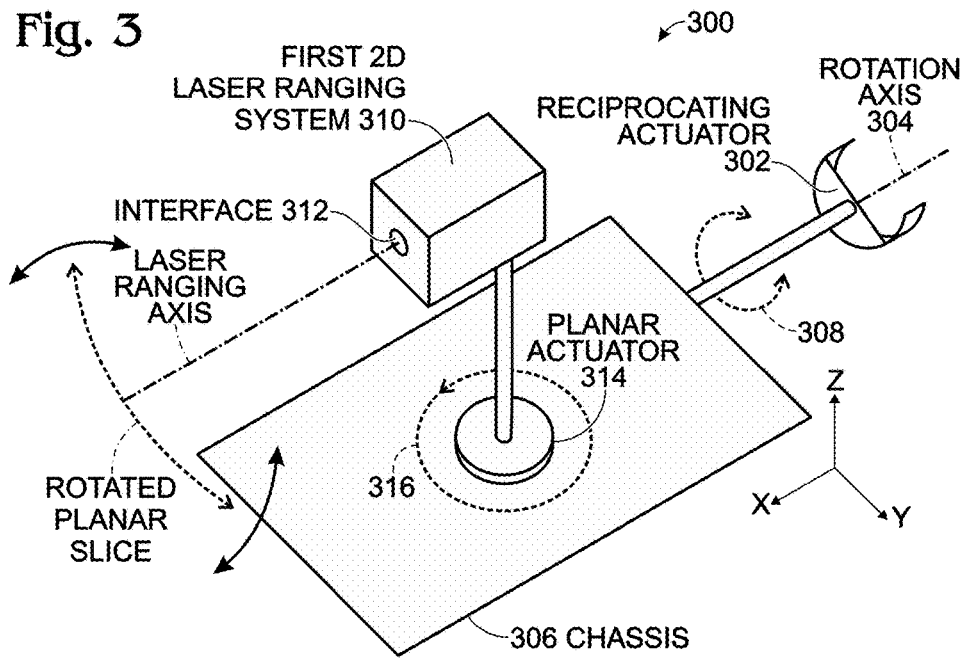
FIG. 3 is a schematic block diagram of a three-dimensional (3D) LiDAR system using a two-dimensional (2D) LiDAR.

FIG. 3 is a schematic block diagram of a three-dimensional (3D) LiDAR system using a two-dimensional (2D) LiDAR. The system 300 comprises a reciprocating actuator 302 having a rotation axis 304. A chassis 306 is attached to the reciprocating actuator 302, and is capable of reciprocal rotation about the rotation axis 304. As used herein, a reciprocating actuator is any mechanical means able to create a reciprocating or oscillating mechanical rotational motion. The reciprocating action is represented by the are 308. A first 2D laser ranging system 310 has an (optical) interface 312 for laser ranging a planar slice of an environment, and is mounted in the chassis 306. The simultaneous laser ranging of the planar slice and chassis rotation create a 3D laser mapping of at least a portion of the environment. More explicitly, the first 2D laser ranging system includes a planar actuator 314 for laser ranging a first planar slice, and the reciprocating actuator 302 rotates the chassis 306 around an axis 304 parallel to the first planar slice. The action of the planar actuator is represented by the circular are 316. Although the arc 316 is shown as circular, alternatively it may move in a reciprocating fashion. The result is a rotated planar slice. As shown in FIG. 2 the planar actuator may be enabled as a spinning or rotating mirror. Since the chassis 306 never completes a full revolution, wiring from external devices, such as power supplies and data processing units, to the first 2D laser ranging system 310 is not completely and continuously twisted.

Alternatively stated, the reciprocating actuator 302 alternates the direction of rotation prior to the completion of a complete revolution around the axis 308. More explicitly, the reciprocating actuator 302 typically rotates the chassis 306 in a first direction less than or equal to 180 degrees, and then rotates the chassis is a second direction, opposite to the first direction, less than or equal to 180 degrees. However, it should be understood that it would be possible to rotate that chassis a full 360 degrees before reversing direction without completely twisting an interconnection wiring. 180 degree rotates provide complete coverage with respect to the x-axis.

Figure 12:
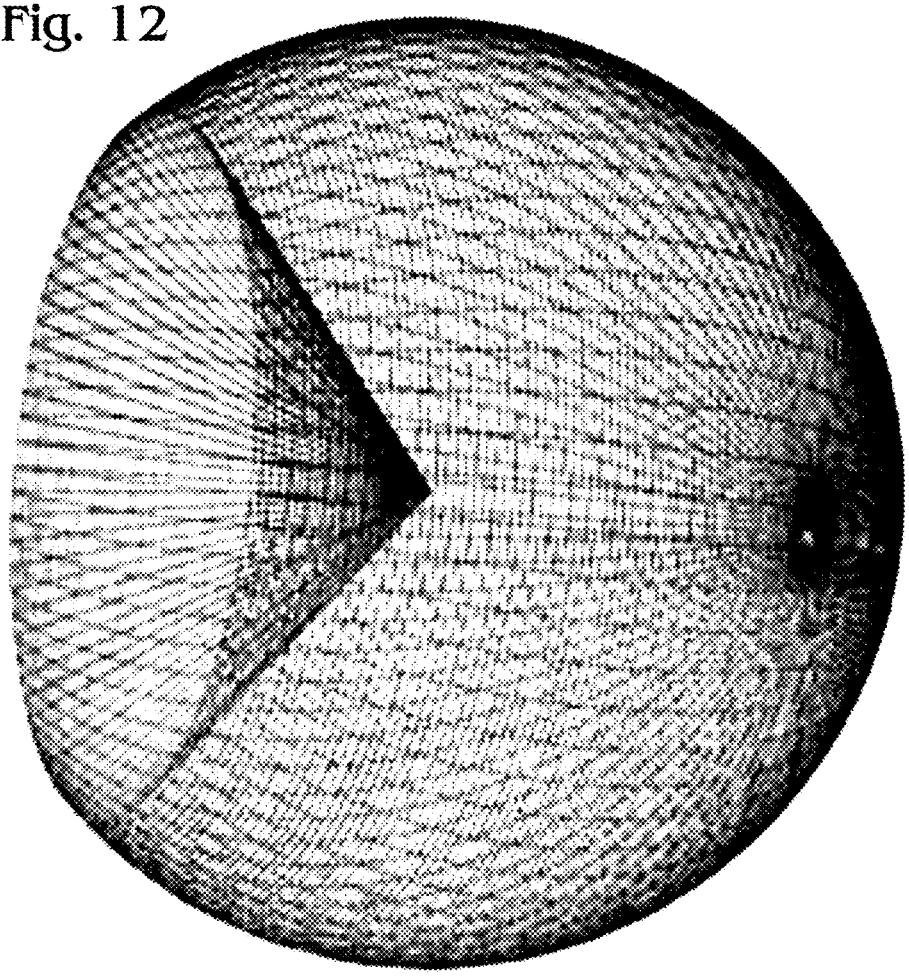
FIG. 12 is a depiction of an exemplary 3D mapping such as might be enabled using the system of FIG. 3.

FIG. 12 is a depiction of an exemplary 3D mapping such as might be enabled using the system of FIG. 3.

Figure 4:
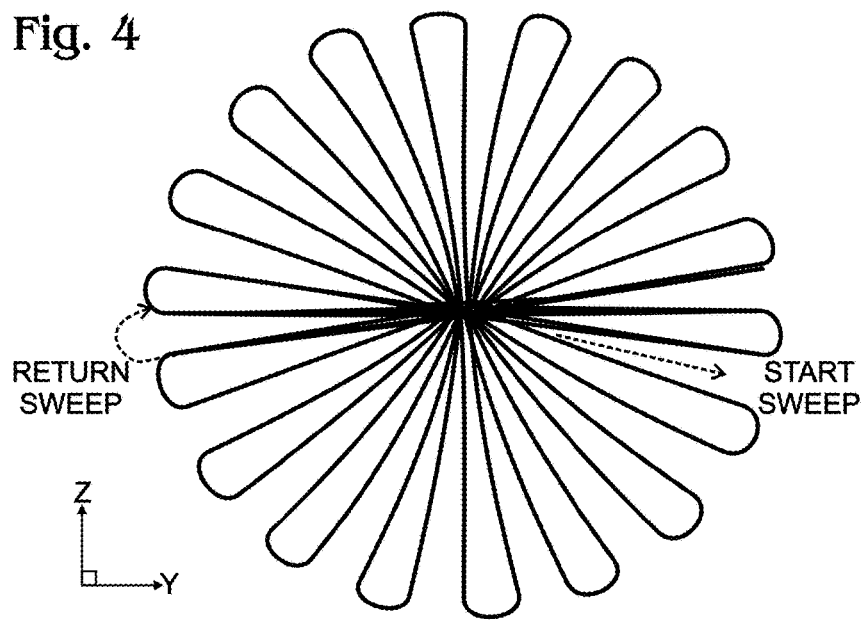
FIG. 4 is a diagram depicting forward-looking scan pattern with the chassis rotating about an X-axis.

FIG. 4 is a diagram depicting forward-looking scan pattern with the chassis rotating about an X-axis. If the planar actuator completes a first plurality of planar sweeps for every reciprocating actuator rotation, then a forward-looking 3D map is created comprising a first plurality of adjacent figure-8 laser scans. That is, this pattern occurs if the planar actuator completes a revolution faster than the reciprocating actuator completes a cycle.

Figure 5:
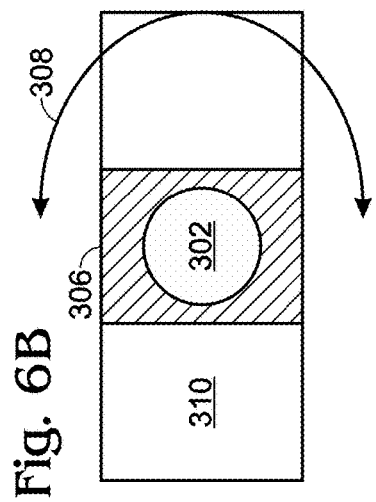
FIG. 5 is a diagram depicting a variation of forward-looking scan pattern with the chassis rotating about an X-axis.

FIG. 5 is a diagram depicting a variation of forward-looking scan pattern with the chassis rotating about an X-axis. If the reciprocating actuator completes a first plurality of reciprocating rotations for every planar actuator sweep, then a forward-looking 3D map is created with a spiral pattern of laser scans. That is, this pattern occurs if the planar actuator completes a revolution slower than the reciprocating actuator completes a cycle.

Figure 6B:
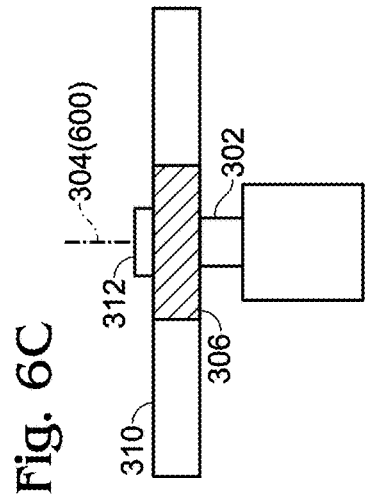
FIGS. 6A through 6C depict, respectively, front, back, and side views of a center-mounted reciprocating actuator.
Figure 6A:
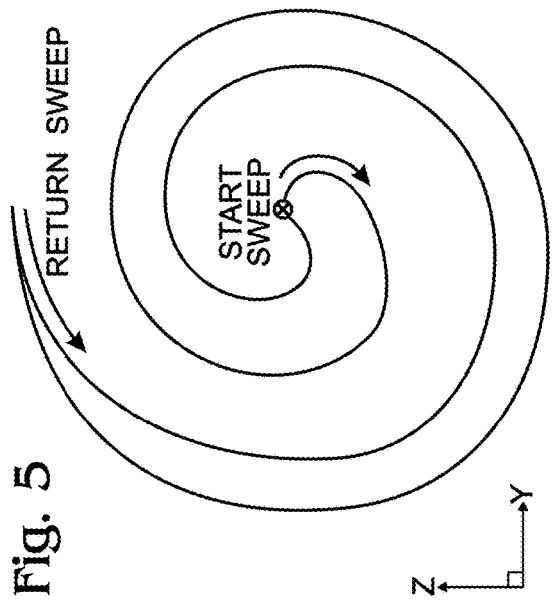
Figure 6C:
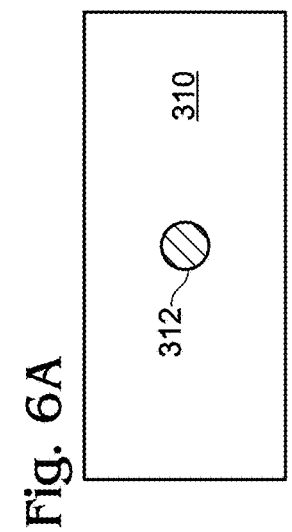

FIGS. 6A through 6C depict, respectively, front, back, and side views of a center-mounted reciprocating actuator. The rotation axis 304 is aligned with the laser ranging axis 600.

FIGS. 7A through 7C depict, respectively, front, back, and side views of a side-mounted reciprocating actuator. As in FIG. 3, the rotation axis 304 is parallel to, but not aligned with a laser ranging axis 600.

FIG. 8 is a side view of an off ranging axis-mounted reciprocating actuator. Here, the rotation axis 304 is non-parallel to a laser ranging axis 600.

Figure 9:
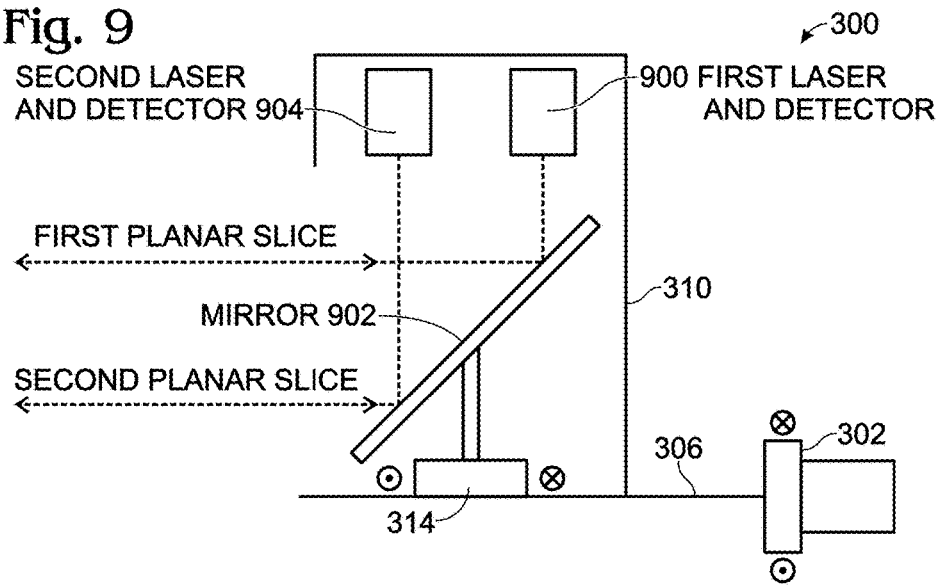
FIG. 9 is a partial cross-sectional view of a system with a second 2D laser ranging system.

FIG. 9 is a partial cross-sectional view of a system with a second 2D laser ranging system. The first 2D laser ranging system is enabled with first laser and detector 900, mirror 902, and planar actuator 314. The second 2D laser ranging system is enabled with second laser and detector 904, and also has a planar actuator for laser ranging a second planar slice, parallel to the first planar slice. In this example, the first and second 2D laser ranging systems share the same planar actuator 314, enabled as a rotating or spinning mirror.

Using more than one (laser) emitter creates the advantage of an increase in the density of sampling points. Another advantage would be to keep the density of sampling points constant, but to lower the scanning rate and thus to reduce component wear and maintenance cost. A disadvantage of this embodiment is increasing computational needs and thus product cost and complexity.

The system described above overcomes interconnection wiring problems by limiting the range of motion of the unit, thus making possible flexible wiring solutions to provide continuous power to the unit and minimizing mechanical failure points.

In one aspect, as depicted in FIGS. 6A-6C, the rotational center for the reciprocating actuator is the "effective" beam origin inside the 2D-LiDAR unit. For example, in a mirror-equipped 2D-LiDAR unit, this location would be at or near the point where the laser beam strikes the rotating mirror. This location simplifies the range finding computation and maximizes the sample density in the forward-facing direction of robotic motion.

As shown in FIG. 4, the oscillation produced by the center-mounted reciprocating actuator may create a rosette-like scan pattern with the maximum sample density in the forward facing (i.e., along the X-axis) direction. Note that it is only necessary to pivot this actuator +/−180° to get full (2D) scan coverage without forward-facing "dead spots". The only dead spots in this configuration are limited to the planar scanning.

Because the reciprocating actuator does not rotate through a full 360° arc, it is possible to provide power and/or data wiring using permanently attached flexible wires. This solution does not use slip-ring electrical contacts nor does it require battery operated power.

One possible advantage for a reciprocating rotational arc of less than 180° is faster oscillation and therefore horizontal sampling rate. However, oscillation angles less than 180° may produce a forward-looking "dead spot".

As shown in FIGS. 3 and 7A-7C, it is possible that the center of gravity for the LiDAR apparatus may not coincide with the "optical center" of the device. Locating the axis of mechanical movement for the LiDAR at the center of gravity may simplify the mechanical design. Similarly the power and/or data wire length may be optimized by off-axis mounting. The disadvantage of doing this may be to increase the complexity of the mathematical calculations for range finding.

Alternatively, as shown in FIG. 8, the LiDAR unit can be rotated about some axis (in any dimension) that is not perpendicular to the base movement of the 2D LiDAR. One advantage may be to emphasize or deemphasize certain portions of the field of view. By creating a higher (or lower) density of samples in selected portions of the field of view, a higher (or lower) certainty of measuring terrain or identifying obstacles may be attained. Emphasizing one portion of the field of view usually accompanies a corresponding de-emphasis of another portion of the field of view. An application-specific tradeoff must be made.

Figure 10:
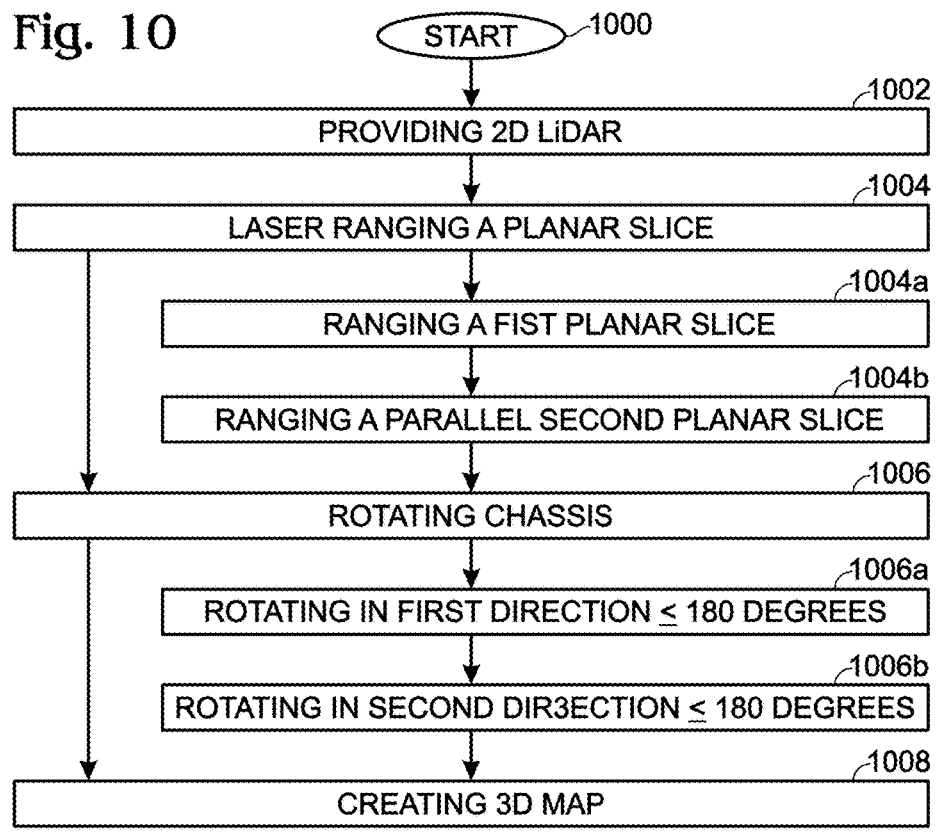
FIG. 10 is a flowchart illustrating a method for using a 2D LiDAR for 3D laser mapping.

FIG. 10 is a flowchart illustrating a method for using a 2D LiDAR for 3D laser mapping. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 1000.

Step 1002 provides a 2D LiDAR mounted in a chassis. Step 1004 laser ranges a planar slice of the environment. In one aspect, Step 1004 includes the following substeps. Step 1004a laser ranges a first planar slice. Step 1004b simultaneously laser ranges a parallel second planar slice. Simultaneous with laser ranging the planar slice(s), Step 1006 rotates the 2D LiDAR chassis about an axis. Step 1006 may rotate the 2D LiDAR chassis around the axis aligned with the laser ranging axis, about an axis parallel to, but not aligned with the laser ranging axis, or about an axis being non-parallel to the laser ranging axis. Step 1008 creates a 3D laser mapping of at least a portion of the environment.

In one aspect, providing the 2D LiDAR includes providing a laser ranging system with a planar actuator, and Step 1002 also mounts the 2D LiDAR chassis on a reciprocating actuator. Then, laser ranging the planar slice in Step 1004 includes laser ranging the planar slice in response to the planar actuator, and rotating the 2D LiDAR chassis in Step 1006 includes rotating the 2D LiDAR chassis around an axis parallel to the planar slice, in response to the reciprocating actuator.

Alternatively stated, rotating the 2D LiDAR chassis around the axis in Step 1006 includes alternating the direction of rotation prior to the completion of a complete revolution of the 2D LiDAR chassis around the axis. More explicitly, Step 1006 may include the following substeps. Step 1006a rotates the 2D LiDAR chassis in a first direction less than or equal to 180 degrees. Step 1006b rotates the 2D LiDAR chassis in a second direction, opposite to the first direction, less than or equal to 180 degrees. However as noted above, rotations as great as 360 degrees are possible.

In one aspect, laser ranging the planar slice in response to the planar actuator in Step 1004 includes completing a first plurality of planar sweeps for every reciprocating actuator rotation. Then, creating the 3D laser mapping in Step 1008 includes creating a forward-looking map comprising a first plurality of adjacent figure-8 laser scans (see FIG. 4). In another aspect, rotating the 2D LiDAR chassis in response to the reciprocating actuator includes completing a first plurality of reciprocating rotations for every planar actuator sweep. Then, Step 1008 creates a forward-looking map with a spiral pattern of laser scans.

FIG. 11 is a flowchart illustrating a variation in the method for using a 2D LiDAR for 3D laser mapping. The method begins at Step 1100. Step 1102 provides a 2D LiDAR mounted in a chassis. Step 1104 laser ranges a planar slice of an environment. Simultaneous with laser ranging the planar slice, Step 1106 rotates the 2D LiDAR chassis in a plane perpendicular to the planar slice, and Step 1108 creates a 3D laser mapping of at least a portion of the environment.

A system and method have been provided for 3D mapping using a 2D LiDAR. Examples of particular hardware configurations have been presented to illustrate the invention. However, the invention is not limited to merely these examples. Other variations and embodiments of the invention will occur to those skilled in the art.

We claim:

1. A method for using a two-dimensional (2D) LiDAR for three dimensional (3D) laser mapping, the method comprising:
   providing a 2D LiDAR mounted in a chassis; wherein providing the 2D LiDAR includes: providing a laser ranging system with a planar actuator;
   mounting the 2D LiDAR chassis on a reciprocating actuator;
   laser ranging a planar slice of an environment; wherein laser ranging the planar slice includes laser ranging the planar slice in response to the planar actuator;
   simultaneous with laser ranging the planar slice, rotating the 2D LiDAR chassis about an axis; wherein rotating the 2D LiDAR chassis includes rotating the 2D LiDAR chassis around an axis parallel to the planar slice, in response to the reciprocating actuator; wherein laser ranging the planar slice in response to the planar actuator includes completing a first plurality of planar sweeps for every reciprocating actuator rotation; and
   creating a 3D laser mapping of at least a portion of the environment; wherein creating the 3D laser mapping includes creating a forward-looking map comprising a first plurality of adjacent figure-8 laser scans.

2. A method for using a two-dimensional (2D) LiDAR for three dimensional (3D) laser mapping, the method comprising:
   providing a 2D LiDAR mounted in a chassis; wherein providing the 2D LiDAR includes: providing a laser ranging system with a planar actuator;
   mounting the 2D LiDAR chassis on a reciprocating actuator;
   laser ranging a planar slice of an environment; wherein laser ranging the planar slice includes laser ranging the planar slice in response to the planar actuator;
   simultaneous with laser ranging the planar slice, rotating the 2D LiDAR chassis about an axis; wherein rotating the 2D LiDAR chassis includes rotating the 2D LiDAR chassis around an axis parallel to the planar slice, in response to the reciprocating actuator; wherein rotating the 2D LiDAR chassis in response to the reciprocating actuator includes completing a first plurality of reciprocating rotations for every planar actuator sweep; and
   creating a 3D laser mapping of at least a portion of the environment; and, wherein creating the 3D laser mapping includes creating a forward-looking map with a spiral pattern of laser scans.

3. A three-dimensional (3D) LiDAR system using a two-dimensional (2D) LiDAR, the system comprising:

a reciprocating actuator having a rotation axis;
a chassis, attached to the reciprocating actuator, and capable of reciprocal rotation about the rotation axis; wherein the reciprocating actuator rotates the chassis around an axis parallel to the first planar slice;
a first 2D laser ranging system, having an interface for laser ranging a planar slice of an environment, mounted in the chassis; wherein the first 2D laser ranging system includes a planar actuator for laser ranging a first planar slice;
wherein the simultaneous laser ranging of the planar slice and chassis rotation create a 3D laser mapping of at least a portion of the environment; wherein the planar actuator completes a first plurality of planar sweeps for every reciprocating actuator rotation; and
wherein a forward-looking 3D map is created comprising a first plurality of adjacent figure-8 laser scans.

4. A three-dimensional (3D) LiDAR system using a two-dimensional (2D) LiDAR, the system comprising:
a reciprocating actuator having a rotation axis;
a chassis, attached to the reciprocating actuator, and capable of reciprocal rotation about the rotation axis; wherein the reciprocating actuator rotates the chassis around an axis parallel to the first planar slice;
a first 2D laser ranging system, having an interface for laser ranging a planar slice of an environment, mounted in the chassis; wherein the first 2D laser ranging system includes a planar actuator for laser ranging a first planar slice;
wherein the simultaneous laser ranging of the planar slice and chassis rotation create a 3D laser mapping of at least a portion of the environment; wherein the reciprocating actuator completes a first plurality of reciprocating rotations for every planar actuator sweep; and
wherein a forward-looking 3D map is created with a spiral pattern of laser scans.

5. The method of claim 1 wherein rotating the 2D LiDAR chassis around the axis includes alternating the direction of rotation prior to the completion of a complete revolution of the 2D LiDAR chassis around the axis.

6. The method of claim 5 wherein alternating the direction of rotation prior to the completion of a complete revolution of the 2D LiDAR chassis around the axis includes: rotating the 2D LiDAR chassis in a first direction less than or equal to 180 degrees; and, rotating the 2D LiDAR chassis in a second direction, opposite to the first direction, less than or equal to 180 degrees.

7. The system of claim 3 wherein the reciprocating actuator alternates the direction of rotation prior to the completion of a complete revolution around the axis.

8. The system of claim 7 wherein the reciprocating actuator rotates the 2D LiDAR chassis in a first direction less than or equal to 180 degrees, and then rotates the 2D LiDAR chassis is a second direction, opposite to the first direction, less than or equal to 180 degrees.

9. The method of claim 2 wherein rotating the 2D LiDAR chassis around the axis includes alternating the direction of rotation prior to the completion of a complete revolution of the 2D LiDAR chassis around the axis.

10. The method of claim 9 wherein alternating the direction of rotation prior to the completion of a complete revolution of the 2D LiDAR chassis around the axis includes: rotating the 2D LiDAR chassis in a first direction less than or equal to 180 degrees; and, rotating the 2D LiDAR chassis in a second direction, opposite to the first direction, less than or equal to 180 degrees.

11. The system of claim 4 wherein the reciprocating actuator alternates the direction of rotation prior to the completion of a complete revolution around the axis.

12. The system of claim 11 wherein the reciprocating actuator rotates the 2D LiDAR chassis in a first direction less than or equal to 180 degrees, and then rotates the 2D LiDAR chassis is a second direction, opposite to the first direction, less than or equal to 180 degrees.

* * * * *

UNITED STATES PATENT AND TRADEMARK OFFICE
CERTIFICATE OF CORRECTION

PATENT NO. : 10,175,361 B2
APPLICATION NO. : 15/221685
DATED : January 8, 2019
INVENTOR(S) : Haines et al.

Page 1 of 1

It is certified that error appears in the above-identified patent and that said Letters Patent is hereby corrected as shown below:

In the Claims

Claim 8, Column 8, Line 16, delete "is" and insert therefor -- in --.

Claim 12, Column 8, Line 35, delete "is" and insert therefor -- in --.

Signed and Sealed this
Ninth Day of July, 2019

Andrei Iancu
*Director of the United States Patent and Trademark Office*